United States Patent
Steenstra et al.

(10) Patent No.: US 9,402,156 B2
(45) Date of Patent: **\*Jul. 26, 2016**

(54) LOCATION BASED SERVICE (LBS) SYSTEM AND METHOD FOR CREATING A SOCIAL NETWORK

(71) Applicant: QUALCOMM Incorporated, San Diego, CA (US)

(72) Inventors: Jack Steenstra, San Diego, CA (US); Kirk Steven Taylor, San Diego, CA (US); Liren Chen, San Diego, CA (US); Alexander Gantman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/230,538

(22) Filed: Mar. 31, 2014

(65) Prior Publication Data

US 2014/0213303 A1    Jul. 31, 2014

Related U.S. Application Data

(63) Continuation of application No. 10/924,480, filed on Aug. 24, 2004, now Pat. No. 8,688,143.

(51) Int. Cl.
*H04W 4/02* (2009.01)
*H04W 4/18* (2009.01)
(Continued)

(52) U.S. Cl.
CPC ............ *H04W 4/023* (2013.01); *G06Q 50/01* (2013.01); *H04L 67/04* (2013.01); *H04L 67/18* (2013.01); *H04W 4/02* (2013.01); *H04W 4/185* (2013.01); *H04W 4/206* (2013.01); *H04W 8/18* (2013.01)

(58) Field of Classification Search
CPC ............. G06Q 50/01; G06Q 30/0269; G06Q 30/0255; G06Q 30/0267; H04W 8/005; H04W 4/02; H04W 4/023; H04W 4/025; G06F 17/30699; H04L 51/32; H04L 67/306

USPC .................... 455/456.1–456.6, 557
See application file for complete search history.

(56) References Cited

U.S. PATENT DOCUMENTS

| 5,852,775 A | 12/1998 | Hidary |
| 5,978,747 A | 11/1999 | Craport et al. |

(Continued)

FOREIGN PATENT DOCUMENTS

| GB | 2375921 A | 11/2002 |
| JP | H07281594 A | 10/1995 |

(Continued)

OTHER PUBLICATIONS

Adelman, et al., "Social Support in the Service Sector: The Antecedents, Processes, and Outcomes of Social Support in an Introductory Service," Journal of Business Research, 1995, vol. 32, pp. 273-282.

(Continued)

*Primary Examiner* — Nathan Mitchell
*Assistant Examiner* — Dung Lam
(74) *Attorney, Agent, or Firm* — Fariba Yadegar-Bandari; Satheesh K. Karra

(57) ABSTRACT

A system and method for providing a location based service to create a social network, comprising activating a feature from a wireless terminal, registering from the wireless terminal with a location based service associated with the feature, creating a profile of a user of the feature, and displaying candidates based on the profile and based on the geographic location of the candidates. A Global Positioning System (GPS) may be used to geographically locate active users of a feature. An activity map may be associated with a feature, the activity map displaying active users of the feature.

27 Claims, 6 Drawing Sheets

(51) Int. Cl.
*H04W 4/20* (2009.01)
*H04L 29/08* (2006.01)
*G06Q 50/00* (2012.01)
*H04W 8/18* (2009.01)

(56) References Cited

U.S. PATENT DOCUMENTS

| | | | |
|---|---|---|---|
| 6,243,039 | B1 | 6/2001 | Elliot |
| 6,246,376 | B1 | 6/2001 | Bork et al. |
| 6,249,282 | B1 | 6/2001 | Sutcliffe et al. |
| 6,381,603 | B1 | 4/2002 | Chan et al. |
| 6,539,232 | B2 | 3/2003 | Hendrey et al. |
| 6,542,749 | B2 | 4/2003 | Tanaka et al. |
| 6,549,768 | B1 | 4/2003 | Fraccaroli |
| 6,564,047 | B1 | 5/2003 | Steele et al. |
| 6,628,938 | B1 * | 9/2003 | Rachabathuni .. H04N 21/25841 455/412.1 |
| 6,735,568 | B1 | 5/2004 | Buckwalter et al. |
| 6,756,913 | B1 | 6/2004 | Ayed |
| 6,819,919 | B1 | 11/2004 | Tanaka |
| 6,828,908 | B2 | 12/2004 | Clark |
| 7,057,591 | B1 | 6/2006 | Hautanen et al. |
| 7,248,884 | B2 | 7/2007 | Miyamoto |
| 7,343,317 | B2 | 3/2008 | Jokinen et al. |
| 7,359,706 | B2 | 4/2008 | Zhao |
| 7,359,716 | B2 | 4/2008 | Rowitch et al. |
| 7,505,757 | B2 | 3/2009 | Rowitch et al. |
| RE42,435 | E | 6/2011 | Katz |
| 8,688,143 | B2 | 4/2014 | Steenstra et al. |
| 8,688,148 | B2 | 4/2014 | Steenstra et al. |
| 2001/0025248 | A1 | 9/2001 | Nihei |
| 2002/0034292 | A1 * | 3/2002 | Tuoriniemi ............ G01C 21/26 379/219 |
| 2002/0055992 | A1 | 5/2002 | King et al. |
| 2002/0103792 | A1 | 8/2002 | Blank et al. |
| 2002/0173978 | A1 | 11/2002 | Boies et al. |
| 2002/0184653 | A1 | 12/2002 | Pierce et al. |
| 2003/0018711 | A1 | 1/2003 | Imanishi |
| 2003/0033582 | A1 | 2/2003 | Klein et al. |
| 2003/0037110 | A1 | 2/2003 | Yamamoto |
| 2003/0154126 | A1 | 8/2003 | Gehlot et al. |
| 2003/0200192 | A1 | 10/2003 | Bell et al. |
| 2003/0216960 | A1 | 11/2003 | Postrel |
| 2004/0100377 | A1 | 5/2004 | Brackett et al. |
| 2004/0198398 | A1 | 10/2004 | Amir et al. |
| 2004/0203923 | A1 | 10/2004 | Mullen |
| 2005/0048987 | A1 | 3/2005 | Glass |
| 2005/0131716 | A1 | 6/2005 | Hanan et al. |
| 2005/0181803 | A1 | 8/2005 | Weaver et al. |
| 2006/0052136 | A1 * | 3/2006 | Harris .................... H04M 1/05 455/557 |
| 2006/0064346 | A1 | 3/2006 | Steenstra et al. |
| 2006/0270419 | A1 | 11/2006 | Crowley et al. |
| 2009/0176506 | A1 | 7/2009 | Rowitch et al. |
| 2014/0149217 | A1 | 5/2014 | Steenstra et al. |

FOREIGN PATENT DOCUMENTS

| | | |
|---|---|---|
| JP | 9325938 A | 12/1997 |
| JP | 11316541 A | 11/1999 |
| JP | 2000167233 | 6/2000 |
| JP | 2000295170 A | 10/2000 |
| JP | 2001167189 A | 6/2001 |
| JP | 2001167384 A | 6/2001 |
| JP | 2001222490 A | 8/2001 |
| JP | 2001265809 | 9/2001 |
| JP | 2001266001 A | 9/2001 |
| JP | 2001291004 A | 10/2001 |
| JP | 2001292238 A | 10/2001 |
| JP | 2001309440 | 11/2001 |
| JP | 2001338083 A | 12/2001 |
| JP | 2001351005 A | 12/2001 |
| JP | 2002027529 A | 1/2002 |
| JP | 2002222138 A | 8/2002 |
| JP | 2002259800 | 9/2002 |
| JP | 2002277279 | 9/2002 |
| JP | 2002288207 A | 10/2002 |
| JP | 2002315059 | 10/2002 |
| JP | 2002366971 A | 12/2002 |
| JP | 2003030230 A | 1/2003 |
| JP | 2003044741 A | 2/2003 |
| JP | 2003058482 A | 2/2003 |
| JP | 2003087420 A | 3/2003 |
| JP | 2003186900 A | 7/2003 |
| JP | 2003209876 A | 7/2003 |
| JP | 2003271643 A | 9/2003 |
| JP | 2003324547 A | 11/2003 |
| JP | 2004056159 A | 2/2004 |
| JP | 2004062490 A | 2/2004 |
| JP | 2004192627 A | 7/2004 |
| KR | 1020010008054 | 2/2001 |
| KR | 20020069767 A | 9/2002 |
| WO | 9741654 A1 | 11/1997 |
| WO | 0022860 A1 | 4/2000 |
| WO | 0028427 A1 | 5/2000 |
| WO | 02062092 A1 | 8/2002 |

OTHER PUBLICATIONS

Ahuvia, et al., "Market Metaphors for Meeting Mates," Research in Consumer Behavior, 1993, vol. 6, pp. 55-83.

Business Wire, "Social Networking Graduates to Wireless at SmallPlanet.Net," May 27, 2004, Retrieved May 8, 2013 from URL http://www.businesswire.com/news/home/20040527005224/en/Social-Networking-Graduates-Wireless-Small-Planet.Net.

Cosmic Cupid—flirt by SMS, "A Picture is worth a thousand words," 2004, Archive URL http://www.cosmiccupid.com/matchpics.html.

International Search Report and Written Opinion-PCT/US05/030214, International Search Authority—European Patent Office, Dec. 28, 2005.

Kyodo News, Japan Today, "Counselors to monitor dating websites to protect minors," May 20, 2004, Retrieved May 8, 2013 from URL: http://www.thefreelibrary.com/Counselors+to+monitor+dating+websites+to+protect+minors.-a0117051944.

Marketdata Enterprises, Inc., "The U.S. Dating Services Market," Apr. 2004, 167 pages.

Mobule.net—Get Connected with Serendipity, "Serendipity," 2004, Archive URL: http://www.mobule.net/inquiries.php.

New Media Age, "Making the perfect match: changes in both society and technology have made online dating an attractive business proposition. But how can companies cash in on the search for love?" Mar. 25, 2004, Retrieved on May 8, 2013 from URL http://www.highbeam.com/doc/1G1-114817785.html.

Newsweek International, "The Singles Scene: Bleep! She's Your Type!" Jun. 6, 2004, Retrieved May 8, 2013 from URL http://www.thedailybeast.com/newsweek/2004/06/06/the-singles-scene-bleep-she-s-your-type.html.

PR Newswire, "Lovehound, the First True Mobile Dating Service, Launches in Time for Valentine's Day," Feb. 13, 2004, 2 pages, Retrieved on May 8, 2103 from URL http://www.prnewswire.com/news-releases-test/lovehound-the-first-true-mobile-dating-service-launches-in-time-for-valentines-day-58993107.html, 2 pages.

Qualcomm, Press Release, "Qualcomm Congratulates China Unicom on its Announcement of Expanded High-Speed Value-Added Services," Jul. 22, 2003, Archive URL http://www.cdmatech.com/news/releases/2003/030722_unicom.jsp.

Reuters, "Wanted: new friend, must have Bluetooth," Jun. 23, 2004, Retrieved May 8, 2013 from URL http://usatoday30.usatoday.com/tech/wireless/data/2004-06-23-bluetooth-pals_x.htm.

Saw-You.com, Corporate Site, "Communidating," Oct. 2002, Archive URL http://www.saw-you.com/corporate/communidating.htm.

South China Morning Post, "Social networks could prove powerful connecting tool," Posted May 10, 2004, Retrieved May 8, 2013 from URL http://www.scmp.com/article/455155/social-networks-could-prove-powerful-connecting-tool.

(56) References Cited

OTHER PUBLICATIONS text.it Media Centre, "SMS dating a real revenue spinner in India," May 13, 2003 (source silicon.con), Archive URL http://www.text.it/mediacentre/default.asp?intPageId=494.

The New Atlantis, Christine Rosen, "Our Cell Phones, Ourselves," Testimonial regarding Dodgeball.com, Jun. 2004, Retrieved May 8, 2013 from URL http://www.thenewatlantis.com/publications/our-cell-phones-ourselves, 15 pages, See p. 5, paragraph 2.

WaveMarket, Press Release, "WaveMarket and Seoul Metropoligtan Police Agency Introduce Traffic and Road Speed Determination using Wireless Carrier Network and Location-Based Alerting Technology," Apr. 19, 2004, 1 page, Archive URL http://www.wavemarket.com/press_release6.html.

WaveMarket, "WaveMarket Introduces First Location-Based Blogging System That Lets Users Create, Broadcast and Share Location-Time Relevant Information," Feb. 16, 2004, 2 pages, Archive URL http://www.wavemarket.com/press_release1.html.

Webmapper, Oct. 2004 archives, Entry Monday, Oct. 18, 2004, "Location and social networks," Retrieved May 8, 2013 from URL http://www.webmapper.nl/archives/2004/10/.

\* cited by examiner

LOCATION BASED SERVICE (LBS) SYSTEM AND METHOD FOR CREATING A SOCIAL NETWORK

REFERENCE TO CO-PENDING APPLICATIONS FOR PATENT

The present Application for Patent is a Continuation of co-pending U.S. patent application Ser. No. 10/924,480, entitled "LOCATION BASED SERVICE (LBS) SYSTEM AND METHOD FOR CREATING A SOCIAL NETWORK", filed on Aug. 24, 2004 by the inventors of the subject application, which is assigned to the assignee hereof, and expressly incorporated by reference herein in its entirety.

BACKGROUND

Field

The present invention relates generally to communication, and more specifically to a system and method for performing location determination and providing location information via a location based services (LBS) architecture to create a social network.

Background

Often, it is desirable to know the location of a wireless user. In fact, it is sometimes necessary. For example, the Federal Communications Commission (FCC) has adopted a report and order for an enhanced 911 (E-9-1-1) wireless service that requires the location of a wireless terminal (e.g., a cellular phone) to be provided to a Public Safety Answering Point (PSAP) each time a 911 call is made from the wireless terminal In addition to the FCC mandate, a network operator/service provider may support various applications that use location based services. Such services provide the location of wireless terminals. "Applications" refer to the particular uses that are made of location information. Often times, applications are implemented with computer software that is either executed by a processor within a wireless terminal or by a processor located within a wireless infrastructure network that is in communication with the wireless terminal Applications that use this information may include, for example, location-sensitive billing, asset tracking, asset monitoring and recovery, fleet and resource management, personal-location services, and so on. Some specific examples of applications for personal-location services include (1) providing a local map to a wireless terminal based on its location, (2) providing a recommendation for a facility (e.g., a hotel or a restaurant) based on the wireless terminal's location, and (3) providing directions to the recommended facility from the wireless terminal's location.

An example of system and method for a location based service can be found in U.S. patent application Ser. No. 10/769,420 entitled, "Location Based Service (LBS) System, Method and Apparatus For Authorization Of Mobile Station LBS Applications," filed Jan. 30, 2004, and assigned to the assignee hereof, and expressly incorporated by reference herein.

An LBS would be helpful in creating and maintaining social networks. Accordingly, there is a need for a system and method for performing location determination and providing location information via a location based services (LBS) architecture to create and maintain a social network.

SUMMARY

In an aspect, a method of providing a location based service to create a social network, comprises activating a feature from a wireless terminal, registering from the wireless terminal with a location based service associated with the feature, creating a profile of a user of the feature, and displaying candidates based on the profile and based on the geographic location of the candidates.

In an aspect, the geographic location of the candidates is based on a Global Positioning System (GPS). In an aspect, the candidates displayed are based on the candidates being represented on an activity map associated with the feature.

In an aspect, wireless terminal, comprises means for activating a feature from a wireless terminal, means for registering from the wireless terminal with a location based service associated with the feature, means for creating a profile of a user of the feature, and means for displaying candidates based on the profile and based on the geographic location of the candidates.

In an aspect, computer readable media embodying a program of instructions executable by a computer program, said computer readable media comprises, a computer readable program code means for activating a feature from a wireless terminal, a computer readable program code means for registering from the wireless terminal with a location based service associated with the feature, a computer readable program code means for creating a profile of a user of the feature, and a computer readable program code means based on the profile and based on the geographic location of the candidates.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive. Various aspects and embodiments of the invention are described in further detail below.

BRIEF DESCRIPTION OF THE DRAWINGS

The disclosed method and apparatus will become more apparent from the detailed description set forth below when taken in conjunction with the following figures in which like reference characters identify like elements.

DETAILED DESCRIPTION

Figure 1:
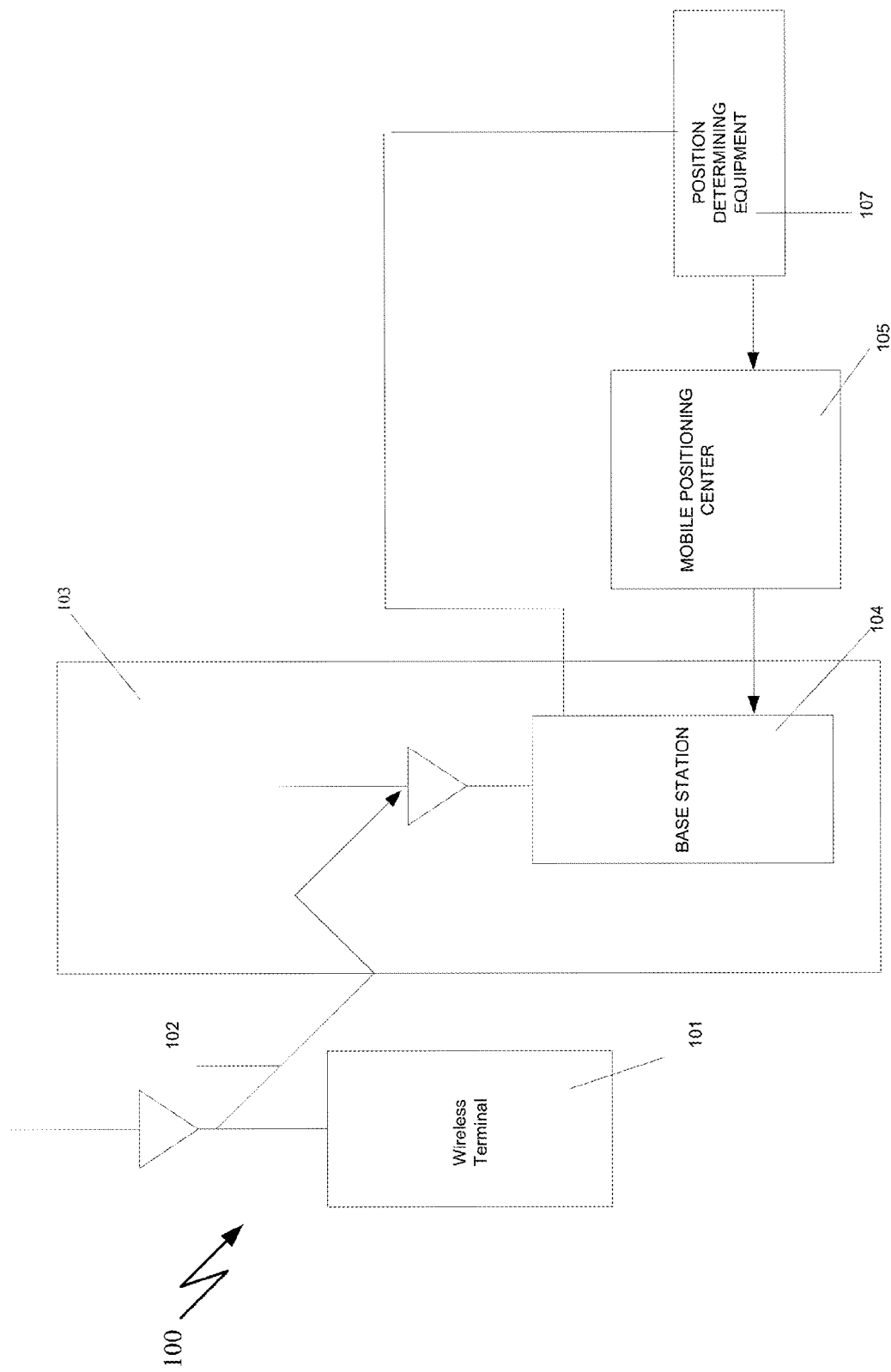
FIG. 1 is a simplified block diagram of a wireless terminal communicating over a wireless link with a wireless network in accordance with an embodiment.

FIG. 1 is a simplified block diagram illustrating a system 100 including a wireless terminal 101, wireless communication network 103, mobile positioning center (MPC) 105, and position determining equipment (PDE) 107 in accordance with an embodiment. The wireless terminal 101 may be any wireless device capable of running a location based service (LBS) application. For the purpose of this document, LBS applications include any program, applet, routine, or other such computer implemented algorithm that uses the location of either the wireless terminal in which the application is running or the location of another wireless terminal to provide information or service to a user. Examples of such LBS applications include programs that can: 1) identify the location of a wireless terminal being operated by another person to allow the LBS client (i.e., the person requesting the LBS service) to locate another person using a properly equipped wireless terminal; 2) locate a nearby product or service outlet and provide the user with directions to the outlet, such as an automatic teller machine or restaurant; 3) track a properly equipped wireless terminal, etc. Examples of wireless devices capable of running an LBS application include cellular telephones, wireless modems, personal information managers (PIMs), personal digital assistants (PDAs), etc.

As shown in FIG. 1, the wireless terminal 101 communicates over a wireless link 102 with the wireless network 103. The wireless network 103 includes at least a base station 104 capable of receiving information from, and transmitting information to, the wireless terminal 101 over the wireless link 102. For the purposes of this disclosure, the base station 104 includes various other components of the wireless network 103 which are not shown for the sake of simplicity, such as base station controllers (BSCs), mobile switching centers (MSCs), etc.

The base station 104 is coupled to the MPC 105 by any conventional communication medium, including, but not limited to cables, microwave links, satellite communication links, etc. Similarly, the MPC 105 is coupled to the PDE 107 by any conventional communication medium.

Figure 2:
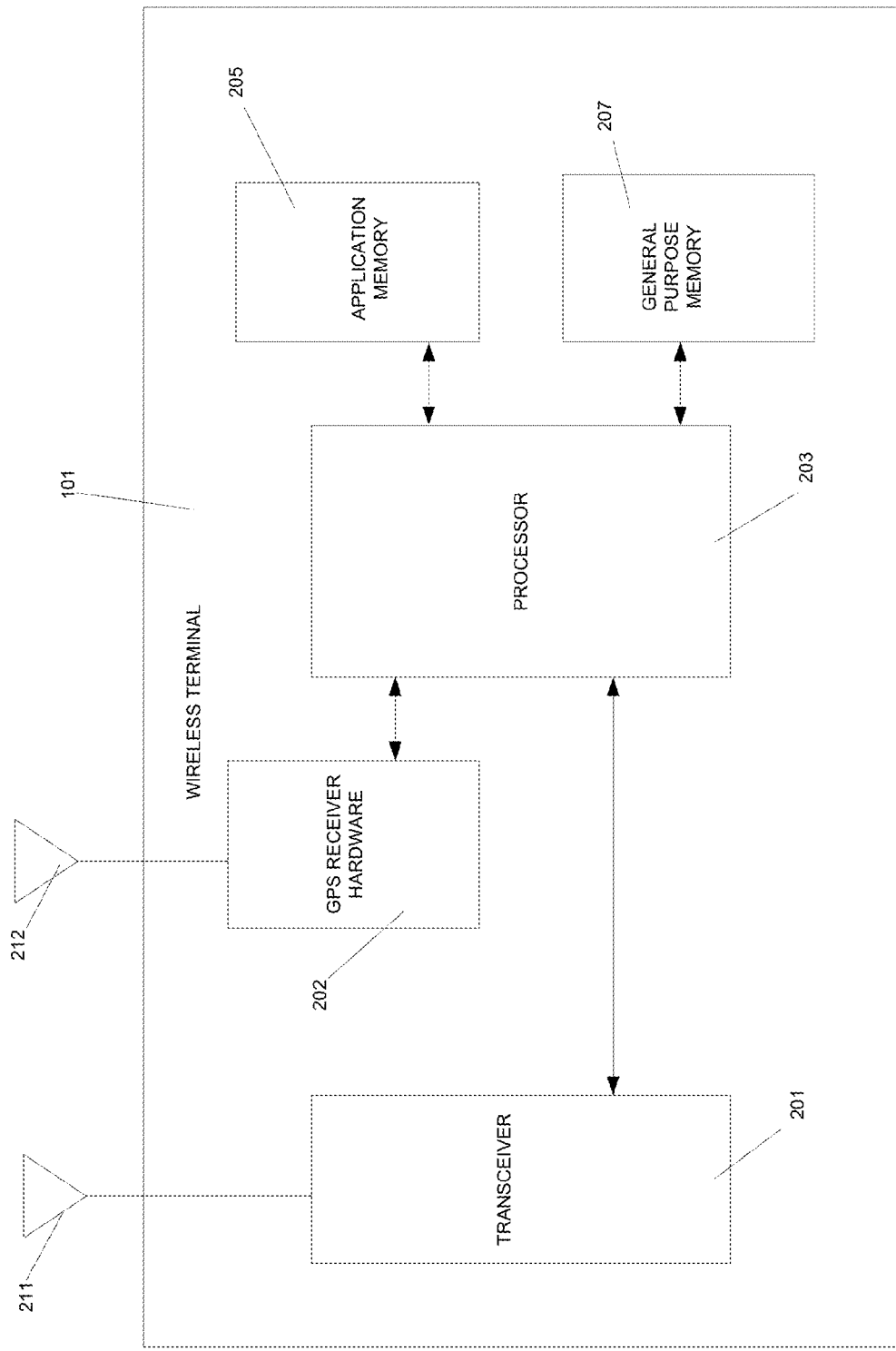
FIG. 2 is a simplified block diagram of the components of a wireless terminal in accordance with an embodiment.

FIG. 2 is a simplified block diagram of the components of a wireless terminal 101 in accordance with an embodiment. The wireless terminal 101 shown in FIG. 2 includes a transceiver 201, Global Positioning System (GPS) receiver hardware 202, a processor 203, an application memory 205, a general purpose memory 207, and antennas 211, 212. Transceiver 201 transmits and receives wireless signals from its antenna 211. GPS receiver hardware 202 transmits and receives wireless signals including location information from its antenna 212.

The processor 203 is shown as one block. However, it should be understood by those skilled in the art that the functions disclosed as being performed by the processor 203 may be performed by a collection of discrete processors either acting in concert or operating independently. Accordingly, such a collection of processors may be either coupled together in order to perform the disclosed functions or they may operate completely independent of one another. Furthermore, in accordance with alternative embodiments, the application memory 205 and general purpose memory 207 may be combined into a single memory device that stores the information disclosed herein as being stored in these two memories 205, 207. In yet another alternative embodiment, the wireless terminal 101 might comprise several additional independent memory devices that share responsibility for storing information within the wireless terminal 101.

Figure 3:
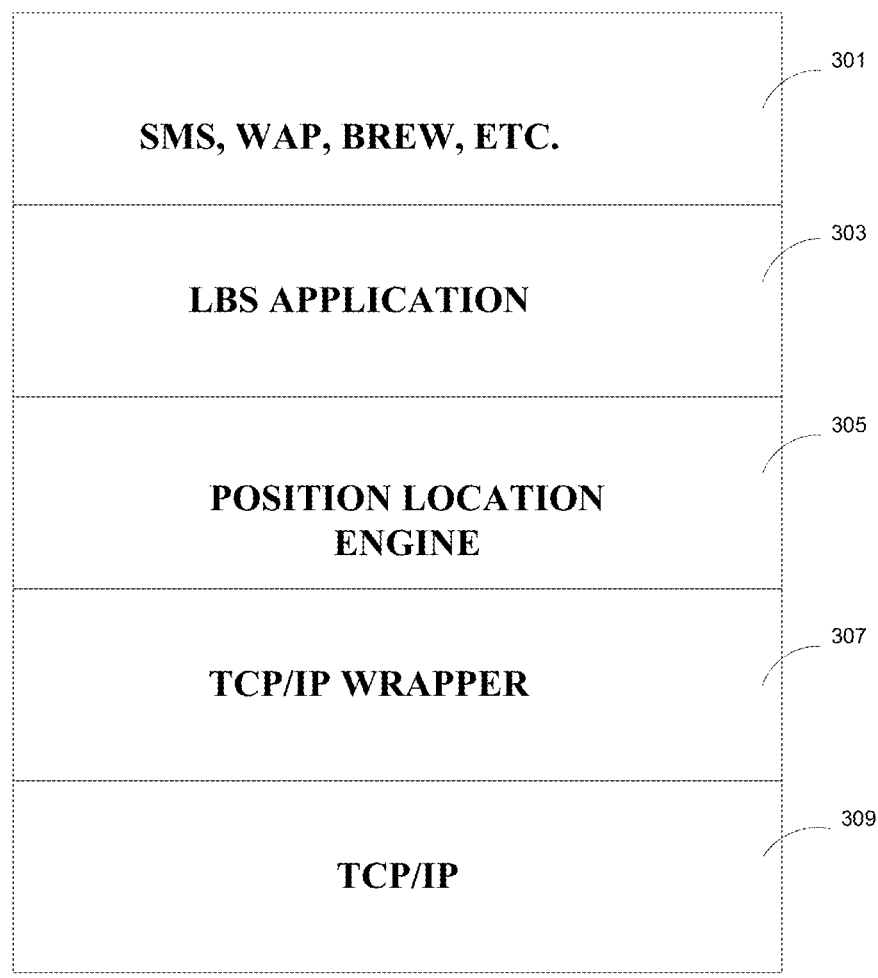
FIG. 3 is a schematic diagram of an example of a protocol stack used within an embodiment.

The processor 203 has several functions that operate in concert as a protocol stack. FIG. 3 is a schematic diagram of an example of a protocol stack used within an embodiment For the purpose of this disclosure, a protocol stack is any set of routines or program instructions that operate together, typically with one routine building on and using the functions of another lower level routine or program. A first function within the protocol stack of FIG. 3 is the operating system 301. The operating system 301 is a foundational function upon which other functions build. That is, the operating system 301 includes functions that can be accessed and used by the other functions performed within the processor 203. In accordance with an embodiment, the operating system 301 is a Binary Run-time Environment for Wireless (BREW) operating system. In an alternative embodiment, the operating system 301 is a Wireless Application Protocol (WAP) system. In another alternative embodiment, the operating system is a Short Message Service (SMS) operating system. In yet another alternative embodiment, the operating system is a Java operating system, etc. Java is a trademark for the operating system of Sun Microsystems. Those skilled in the art will appreciate that the particular operating system used is not directly relevant to the presently disclosed method and apparatus for performing location determination and providing location information via a location based services (LBS) architecture.

In accordance with an embodiment, an LBS application 303 runs on top of the operating system 301. In one example, the LBS application 303 may access and utilize user interface functions to receive information from the wireless terminal user through a conventional data input device, such as a keyboard or touch screen. The LBS application may also access and utilize the operating system functions to provide information back to the wireless terminal user through a liquid crystal diode (LCD) display screen.

One function of the LBS application is to provide the wireless terminal user with the ability to locate the wireless terminal, determine what points of interest and service outlets are in the vicinity of the wireless terminal (e.g., shops, automatic teller machines, restaurants, museums, etc.) and provide navigational directions and maps to the user based on a knowledge of the location of the wireless terminal and the location of particular service outlets and points of interest.

The LBS application 303 locates the wireless terminal 101 by accessing a position location engine 305. The position location engine 305 may be any function capable of determining the location of the wireless terminal 101. In an embodiment, the position location engine 305 is a component of a global positioning satellite (GPS) system. The position location engine 305 in this example includes a GPS receiver function that allows the wireless terminal (together with the GPS receiver hardware 202) to receive information from GPS satellites for the purpose of determining the location of the wireless terminal 101.

In addition, in an embodiment, the position location engine 305 requests and receives aiding information from the PDE 107. For example, in an embodiment, the wireless terminal requests information as to which satellites are "in view". If a satellite is in view, then the wireless terminal 101 should be able to receive and demodulate information from that satellite.

In addition, the wireless terminal 101 might request information regarding the locations of the in-view satellites, information about correction factors to be used when calculating the location of the wireless terminal 101 using information received from the in-view satellites, information regarding the amount of Doppler shift that the wireless terminal 101 might expect to encounter when receiving signals from the in-view satellites, and other such useful information. This information enables the wireless terminal 101 to more rapidly detect and "acquire" satellites. Acquisition of a satellite refers to the process by which the wireless terminal 101 receives signals transmitted from the satellite and aligns the received information with local timing within the wireless terminal 101 in preparation for the wireless terminal 101 to interpret information modulated on the signals transmitted by the satellite.

FIG. 3 also shows a TCP/IP wrapper 307 in accordance with an embodiment. The TCP/IP wrapper 307 is a protocol layer that provides support for sending and receiving messages in accordance with the well-known TCP/IP communication protocol. Accordingly, information that is to be transmitted by the wireless terminal 101 in accordance with the TCP/IP protocol is provided to the TCP/IP wrapper 307. The TCP/IP wrapper 307 then formats the information appropriately in accordance with the TCP/IP protocol specification so that other devices to which the information is to be transmitted can receive and interpret the information sent by the wireless terminal 101.

Once the TCP/IP wrapper 307 has formatted the information, the formatted information is passed to the TCP/IP layer 309. The TCP/IP layer 309 transmits the information in accordance with the TCP/IP protocol (i.e., the request/response ordering of the messages which constitute the handshake that takes place between a transmitting and receiving device in accordance with the TCP/IP protocol).

Qsocial is an LBS application that combines wireless multimedia and high speed data services. In an embodiment, Qsocial is an online dating application. Using Qsocial as an online dating application, users can arrange social engagements using Qsocials' multi-media features and location based services.

A Qsocial user can arrange for an instant date with another Qsocial user. Such an arrangement would create a social network. A social network is a plurality of users coupled by a social purpose.

In accordance with an embodiment, the instant date can be arranged spontaneously based on the profile and location of the Qsocial users. For example, a Betty and Jane may be spending an evening in a nightclub district. They think it would be fun to have dates. In accordance with an embodiment, they use an instant date feature of Qsocial to register that they are actively looking for dates.

A Qsocial server accesses their profiles given they were previously stored. Alternatively, the Qsocial server interrogates the Qsocial users for their profiles.

The Qsocial server (not shown) can be a part of the wireless network 103 of FIG. 1 or can be another network. It would be apparent to those skilled in the art that the Qsocial server can be a single server or a bank of servers not necessarily in geographical proximity to one another. It would also be apparent to those skilled in the art that a server need not be labeled a server. A server is a shared device on a network having a processor and a memory.

Once registered, the Qsocial server accesses the profiles and location of Betty and Jane. The Qsocial server then sends Betty and Jane profile(s) of people that match their profiles and location. Betty and Jane select from a list of matched profiles and locations. The instant date feature of Qsocial notifies their selections that they have been selected. Their selections may accept or deny the implied proposal from being selected. If the selections, i.e., the people selected, accept the implied proposal, then a meeting place may be arranged.

Figure 4:
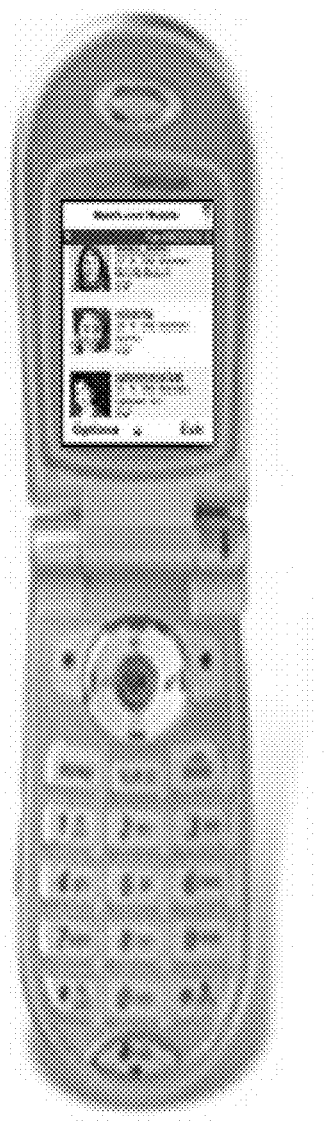
FIG. 4 illustrates a handset having a display of three possible selections for a Qsocial user in accordance with an embodiment.

FIG. 4 illustrates a handset having a display of three possible selections for a Qsocial user in accordance with an embodiment. The Qsocial user may scroll up or down the list for more possible selections if there are more selections available.

In an embodiment, selections match the profiles of the registered instant date users. Alternatively, the selections may match a desired profile or subset of a profile.

A profile comprises a plurality of features regarding a Qsocial user. In accordance with an embodiment, a profile includes the age, height, weight, gender, race/ethnicity, religion, education, hobby(s), and user-defined features of a Qsocial user.

A Qsocial user may define a desired profile to be matched. A user may not care about some features and can specify "don't care" for those particular features. For example, a Qsocial user may not care about the race, ethnicity, or religion of another person. On the other hand, a Qsocial user may have very specific requirements about a desired match. For example, the Qsocial user may want a date with a surfer or a skateboarder and may define such a feature in a profile.

In an embodiment, Qsocial includes an activity map feature. Activity maps provide a map of active Qsocial users within a geographic area. An activity map may provide historical statistics of locations of active users.

Figure 5:
FIG. 5 shows an activity map used for an instant date displaying active males and females in a geographic region.

What is considered active depends on the application of the activity map. For example, an activity map used for an instant date may show all the active males 502 and females 504 in a region as shown in FIG. 5. In an embodiment, an active user is a user that indicates that he/she is active.

In an embodiment, the instant date feature utilizes the activity map feature. The candidates displayed are those that match a profile and are active on a selected activity map. Thus, a Qsocial user that matches the profile, but is not represented on the selected activity map is not shown as a candidate in accordance with an embodiment. In an embodiment, a Qsocial user associates an activity map with the instant date feature. The Qsocial user may dynamically change the activity map by changing parameters of the activity map. Such parameters may include longitudinal and latitude ranges. The Qsocial user may also indicate the center of the activity map and may scroll the activity map up, down, right, or left.

In accordance with an embodiment, the geographic dimensions of the activity map may be dynamically modified according to user input for predefined parameters. For example, a predefined parameter may include display number of candidates. Thus, a Qsocial user entering 10 as an input for display number of candidates, results in the currently selected activity map expanding or shrinking such that 10 candidates are displayed. The activity map conforms to the input parameter.

In an embodiment, a matcher engine takes as input a profile and using artificial intelligence techniques known in the art, formulates a match for the Qsocial user responsive to the input profile. The matcher engine is a software module that executes on the Qsocial server. The matcher engine is not limited to simple pattern matching, but may be parameterized and weigh characteristics of the input profile according to sociological studies for example. In accordance with another embodiment, the matcher engine can take be dynamically modified by the user to take as input any data that a user may deem relevant.

In accordance with an embodiment, Qsocial includes a club mingle feature. In an embodiment, the club mingle feature requires only temporary registration. The registration is valid only for a period of time. In an embodiment, the period of time can be programmable. Profiles can be used for matching and filtering as they can in an instant date feature.

In an embodiment, the club mingle application does not need the location based service. For example, Betty and Jane go to a nightclub. After entering the nightclub, they use the club mingle feature and register with the nightclub's mingle group. They use their camera phone to submit their current image so they can be recognized in the club. Betty spots a male she would like to dance with and browses the mingle group on her phone to see if he has registered. Betty finds the male in the nightclub's mingle group and sends him an invitation to dance.

In accordance with an embodiment, Qsocial includes a conference companion feature. The conference companion feature also has temporary registration, but is event and location based. Registration is limited to those active users within a particular geographic location for a particular event. Betty, from Idaho, attends a developer's conference in San Diego. Betty uses her conference companion feature to register with a conference companion group, indicating interest in LBS applications. Other registrants for the conference companion group see on their wireless terminals display that Betty has registered with the conference companion group. Two of the registrants for the conference companion group then send invitations to Betty inviting her to have lunch. Betty views her wireless terminal's display and sees that she has two invitations. She then selects one of the invitations, the selection being displayed on the wireless terminal display of the selected inviter.

In accordance with an embodiment, Qsocial includes an interest group feature. The interest group feature requires an LBS application. The interest group is not necessarily romantic. In an embodiment, the interest group can be spontaneous and can be setup online. For example, on a Saturday morning, Alex wants to play pick-up basketball. Alex registers as active in an interest group he creates for basketball. Five other active users of Qsocial see the newly created interest group based on their being in the same geographical location as Alex and their having an interest in basketball, which is in their profile. The five active users respond, and using the interest group feature, arrange to meet at the Neighborhood Park and play 3-on-3 basketball. In creating the basketball interest group, Alex could put a time limit on the basketball interest group.

In an embodiment, an interest group can be a fixed interest group. There is no time limit on the fixed interest group. For example, the basketball interest group could have already existed. Thus, an interest group can be static or dynamic.

In accordance with an embodiment, Qsocial includes product features. Using the club mingle feature, a business establishment such as a nightclub can register as an advertiser of the club mingle feature and offer drinks at a discount to active users of the club mingle feature. The ad offering the discount can be active or passive. The ad can be pushed to an active user utilizing the club mingle feature when mingling with others at the business establishment. The ad can also be available to an active user passively. The user must pull the ad from an ad database. In contrast to pushing an ad, pulling an ad from a database means the ad becomes available to an active user only if the active user searches or finds the ad from Qsocial's database of ad sponsors.

The instant date feature also includes an advertising feature much like the club mingle feature. Advertising can be pushed or pulled. An example of push advertising for the instant date feature includes a Qsocial server locating a nearby florist and giving the active user access to an online purchase ready for pick-up.

Also using the instant date feature, an active user can arrange for a prepaid cab pick-up/drop-off for his/her date without knowing the address of his/her date. Thus, the home address of a date can be kept private from the other party. In an embodiment, the date's active state is automatically deactivated upon payment of the cab pick-up/drop-off. In an embodiment, the date has to manually deactivate his/her active state before returning home to prevent the other party from knowing his/her location.

Also in conjunction with the instant date feature, once a date is accepted and agreed upon, an LBS is used to identify local theater and purchase tickets, for example. In another example, an LBS is used to identify a local restaurant and make reservations.

In an embodiment, the Qsocial feature includes a menu having instant date, activity maps, club mingle, conference companion, interest group, and product features as selections.

In an embodiment, multimedia messaging services (MMS) are used in conjunction with the Qsocial features.

Figure 6:
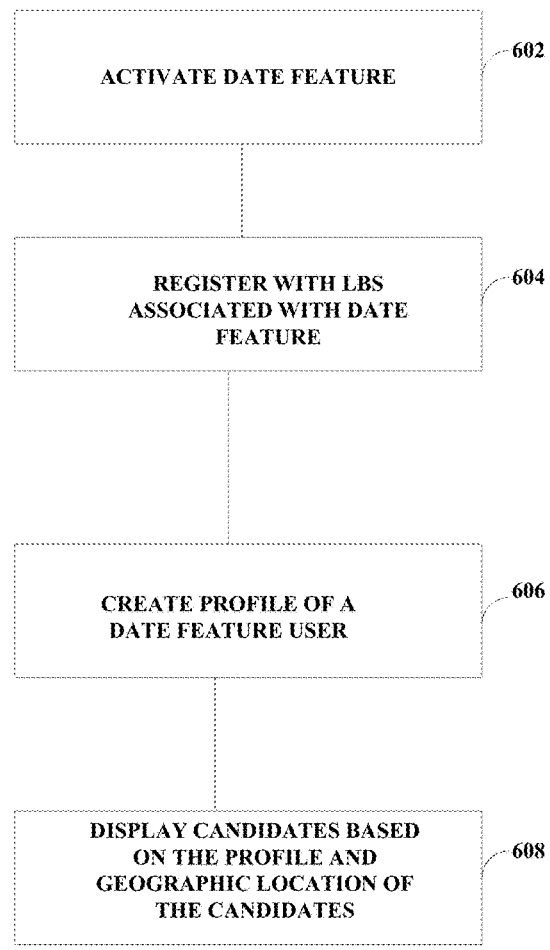
FIG. 6 shows a general flowchart for a method of providing a location based service to create a social network in accordance with an embodiment.

FIG. 6 shows a general flowchart 600 for a method of providing a location based service to create a social network in accordance with an embodiment. In step 602, a date feature is activated from a wireless terminal. It would be apparent to those skilled in the art that any technique known in the art to activate a feature can be used. In step 604 a user registers from the wireless terminal with a location based service associated with the date feature. In step 606, a profile is created of a user of the date feature. In step 608, candidates for a date are displayed based on the profile and based on the geographic location of the candidates.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a terminal, comprising:
   registering an operator of the terminal to a matching service;
   receiving location information that identifies a set of locations for a set of candidates registered to the matching service and associated with a corresponding set of candidate profiles that each match a desired profile of the operator of the terminal;
   displaying a map that identifies at least one location of at least one candidate from the set of candidates based on the terminal and the at least one candidate being commonly registered to the matching service irrespective of whether the operator and the at least one candidate have a prior relationship;
   obtaining, by the terminal, a selection of a given candidate from the at least one candidate in response to the displaying;
   arranging, by the terminal via the matching service, a meeting between the operator of the terminal and the given candidate at a target location in response to the selection; and
   purchasing, by the terminal via the matching service, transportation for the given candidate between a private address and the target location without the private address of the given candidate being shared by the matching service with the operator of the terminal.

2. The method of claim 1, wherein the at least one location corresponds to at least one current location of the at least one candidate.

3. The method of claim 1, wherein the at least one location corresponds to at least one historical location of the at least one candidate.

4. The method of claim 1, wherein the map further identifies one or more points of interest and/or service outlets in a vicinity of the terminal.

5. The method of claim 1, wherein the matching service is an online dating service, a conference companion service or an interest group service.

6. The method of claim 1,
   wherein the private address is a home location of the given candidate.

7. The method of claim 1, further comprising:
   modifying the map in response to a user-initiated change to a geographic area being displayed in the map and/or one or more candidate display parameters.

8. The method of claim 1, wherein information separate from the at least one location of the at least one candidate is kept private from the operator of the terminal.

9. The method of claim 8, wherein the information includes a home address of the at least one candidate.

10. The method of claim 1,
    wherein the matching service requires its registered users to be either in an active state or an inactive state,
    wherein location sharing between the registered users only occurs between the registered users in the active state, and
    wherein the displaying is based upon the operator of the terminal and the at least one candidate being in the active state.

11. A terminal, comprising:
    means for registering an operator of the terminal to a matching service;
    means for receiving location information that identifies a set of locations for a set of candidates registered to the matching service and associated with a corresponding set of candidate profiles that each match a desired profile of the operator of the terminal;
    means for displaying a map that identifies at least one location of at least one candidate from the set of candidates based on the terminal and the at least one candidate being commonly registered to the matching service irrespective of whether the operator and the at least one candidate have a prior relationship;
    means for obtaining a selection of a given candidate from the at least one candidate in response to the displaying of the map;
    means for arranging, via the matching service, a meeting between the operator of the terminal and the given candidate at a target location in response to the selection; and
    means for purchasing, via the matching service, transportation for the given candidate between a private address and the target location without the private address of the given candidate being shared by the matching service with the operator of the terminal.

12. The terminal of claim 11,
    wherein the at least one location corresponds to at least one current location of the at least one candidate, or
    wherein the at least one location corresponds to at least one historical location of the at least one candidate.

13. The terminal of claim 11, wherein the map further identifies one or more points of interest and/or service outlets in a vicinity of the terminal.

14. The terminal of claim 11, wherein the matching service is an online dating service, a conference companion service or an interest group service.

15. The terminal of claim 11, further comprising:
    means for modifying the map in response to a user-initiated change to a geographic area being displayed in the map and/or one or more candidate display parameters.

16. The terminal of claim 11, wherein information separate from the at least one location of the at least one candidate is kept private from the operator of the terminal.

17. A terminal, comprising:
    a processor coupled to a transceiver and a display and configured to:
    register an operator of the terminal to a matching service;
    receive location information that identifies a set of locations for a set of candidates registered to the matching service and associated with a corresponding set of candidate profiles that each match a desired profile of the operator of the terminal;
    display a map that identifies at least one location of at least one candidate from the set of candidates based on the terminal and the at least one candidate being commonly registered to the matching service irrespective of whether the operator and the at least one candidate have a prior relationship;

obtain a selection of a given candidate from the at least one candidate in response to the display of the map;

arrange, via the matching service, a meeting between the operator of the terminal and the given candidate at a target location in response to the selection; and purchase, via the matching service, transportation for the given candidate between a private address and the target location without the private address of the given candidate being shared by the matching service with the operator of the terminal.

18. The terminal of claim 17, wherein the at least one location corresponds to at least one current location of the at least one candidate, or wherein the at least one location corresponds to at least one historical location of the at least one candidate.

19. The terminal of claim 17, wherein the map further identifies one or more points of interest and/or service outlets in a vicinity of the terminal.

20. The terminal of claim 17, wherein the matching service is an online dating service, a conference companion service or an interest group service.

21. The terminal of claim 17, wherein the processor is further configured to modify the map in response to a user-initiated change to a geographic area being displayed in the map and/or one or more candidate display parameters.

22. A non-transitory computer-readable medium containing instructions stored thereon, which, when executed by a terminal, cause the terminal to perform operations, the instructions comprising:

at least one instruction to cause the terminal to register an operator of the terminal to a matching service;

at least one instruction to cause the terminal to receive location information that identifies a set of locations for a set of candidates registered to the matching service and associated with a corresponding set of candidate profiles that each match a desired profile of the operator of the terminal;

at least one instruction to cause the terminal to display a map that identifies at least one location of at least one candidate from the set of candidates based on the terminal and the at least one candidate being commonly registered to the matching service irrespective of whether the operator and the at least one candidate have a prior relationship;

at least one instruction to cause the terminal to obtain a selection of a given candidate from the at least one candidate in response to the display of the map;

at least one instruction to cause the terminal to arrange, via the matching service, a meeting between the operator of the terminal and the given candidate at a target location in response to the selection; and at least one instruction to cause the terminal to purchase, via the matching service, transportation for the given candidate between a private address and the target location without the private address of the given candidate being shared by the matching service with the operator of the terminal.

23. The non-transitory computer-readable medium of claim 22, wherein the at least one location corresponds to at least one current location of the at least one candidate, or wherein the at least one location corresponds to at least one historical location of the at least one candidate.

24. The non-transitory computer-readable medium of claim 22, wherein the map further identifies one or more points of interest and/or service outlets in a vicinity of the terminal.

25. The non-transitory computer-readable medium of claim 22, wherein the matching service is an online dating service, a conference companion service or an interest group service.

26. The non-transitory computer-readable medium of claim 22, further comprising:

at least one instruction to cause the terminal to modify the map in response to a user-initiated change to a geographic area being displayed in the map and/or one or more candidate display parameters.

27. The non-transitory computer-readable medium of claim 22, wherein information separate from the at least one location of the at least one candidate is kept private from the operator of the terminal.

* * * * *